United States Patent
Siripunkaw et al.

(10) Patent No.: US 8,280,990 B2
(45) Date of Patent: *Oct. 2, 2012

(54) EDGE QAM CONFIGURATION AND MANAGEMENT

(75) Inventors: Pak Siripunkaw, Sicklerville, NJ (US); Robert Gaydos, Harleysville, PA (US)

(73) Assignee: Comcast Cable Holdings, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/010,086

(22) Filed: Jan. 20, 2011

(65) Prior Publication Data
US 2011/0179148 A1    Jul. 21, 2011

Related U.S. Application Data (63) Continuation of application No. 11/622,165, filed on Jan. 11, 2007, now Pat. No. 7,890,611.

(60) Provisional application No. 60/758,487, filed on Jan. 12, 2006.

(51) Int. Cl.
 *G06F 15/177* (2006.01)
 *G06F 15/16* (2006.01)
(52) U.S. Cl. .................... 709/220; 709/203; 709/217
(58) Field of Classification Search .......... 709/202–203, 709/217–221, 249–250
 See application file for complete search history.

(56) References Cited

U.S. PATENT DOCUMENTS

| 6,049,826 | A | 4/2000 | Beser |
| 6,088,515 | A | 7/2000 | Muir et al. |
| 7,107,326 | B1 | 9/2006 | Fijolek et al. |
| 7,305,531 | B2 | 12/2007 | Iwamura et al. |
| 7,310,664 | B1 * | 12/2007 | Merchant et al. ............. 709/220 |
| 7,318,101 | B2 | 1/2008 | Droms |
| 7,334,258 | B1 * | 2/2008 | Ford et al. ......................... 726/4 |
| 7,620,711 | B2 | 11/2009 | Boese et al. |
| 7,890,611 | B2 * | 2/2011 | Siripunkaw et al. .......... 709/220 |

FOREIGN PATENT DOCUMENTS
WO    2005/008419 A2    1/2005

* cited by examiner

*Primary Examiner* — Bharat N Barot
(74) *Attorney, Agent, or Firm* — Banner & Witcoff, Ltd.

(57) ABSTRACT

A method of configuring an edge device in a network wherein a transport network interfaces with edge devices that interface with client devices involves a configuration file. The edge device can be configured by downloading the configuration file to the edge device. The method comprises connecting the edge device to the network, downloading the configuration file to the edge device, and configuring the edge device. The configuration file may contain configuration information for the edge device including information relating to at least one edge device input and information relating to at least one output.

19 Claims, 7 Drawing Sheets

Config /60

| Device | Element | | Device Configuration |
|---|---|---|---|

Device /62

| NMSAccess | Element | | One or more Network management setting |
|---|---|---|---|
| Component | Element | | One or more Component setting |
| VendorConfig | Element | | Vendor specific setting |

NMSAccess /64

| NMSAccessIP | Attribute | IPv4, IPv6 | The IP address (or subnet) or the network management station. The address 255.255.255.255 is defined to mean any NMS. If traps are enabled for this NMSAccessIP then the value should be the address of a specific device/NMS station. |
|---|---|---|---|
| NMSAccessMask | Attribute | x.x.x.x | The IP subnet mask of the network management station. If traps are enabled for this NMSAccessIP then the value should be 255.255.255.255. |
| NMSAccessControl | Attribute | string | Value specifying the access allow to this NMS. The valid values include: "read" allow access by 'get' and 'get-next' PDUs; "readWrite" allow access by 'get', 'get-next' and 'set' PDUs "roWithTrap", "rwWithTrap", "trapOnly" control distribution of Trap PDUs transmitted by this device. |
| NMSAccessCommunity String | Attribute | string | The community string to be matched for SNMP access from the NMS specified in NMSAccessIP to this device. |

Fig. 3A

Component  /66

| Type | Attribute | ED | 1 | Describes the type of component being configured. |
|---|---|---|---|---|
| name | Attribute | Name | | Describes the name of the component. |
| cost | Attribute | Number | | Describes a static cost for use of this resource that is reported in VREP. |
| streamingZone | Attribute | Name | | Streaming zone this component operates in. |
| warehouse | Attribute | IPv4, IPv6 | | IP address for warehouse server. Only include if type = 2 or 4 or 5 or 6 or 8 or 9 or 10 or 11. |
| warehouseHttpTimeout | Attribute | Number | | Time (in second) the warehouse client wait before declaring that an HTTP response is lost. Only include if type = 2 or 4 or 5 or 6 or 8 or 9 or 10 or 11. |
| eventLoggingServer | Attribute | IPv4, IPv6 | | IP add for event logging server. |
| capacityUpdate | Attribute | Number | | In seconds, how often to send the Capacity update info to the warehouse server. Only included if type = 2 or 4. |
| EventLogLevel | Element | | | Describe event notification setting. |
| ED_Info | Element | | | Describes info for edge devices. Only included if type = 1. |
| Discovery | Element | | | Describes the info for auto-discovery. |

Fig. 3B

EventLogLevel  70

| alert | attribute | BITS | Type of notification to send event. Implementations may not necessarily support all options for all event classes. If the syslog(0) bit is set, then generate syslog and send via L interface, if the traps(1) bit is set, then generate a trap, if the locallog(2) bit is set, then log to local log. |
|---|---|---|---|
| critical | attribute | BITS | Same as above. |
| error | attribute | BITS | Same as above. |
| warning | attribute | BITS | Same as above. |
| notice | attribute | BITS | Same as above. |
| information | attribute | BITS | Same as above. |
| debug | attribute | BITS | Same as above. |

Discovery  72

| interface | Attribute | D2-D7 | Lists the interface (protocol) that the addresses are associated with. |
|---|---|---|---|
| VREPHoldTime | Attribute | Number | VREP holding time in seconds. |
| Data | | Comma separated list of addresses | Lists the address where discovery information should be sent |

ED_Info  74

| edgeMibTrap | Attribute | Numeric | Enable/disable notification (1=on, 0=off). |
|---|---|---|---|
| signalLostTimeout | Attribute | number | Timeout in milliseconds. If no packets are received for a session for longer than this time period, the status of the session is set to inactive. The existing output PSI data will still be sent out. If a packet arrives after this timeout, the video will be forwarded to the output. The session will be re-snooped for PSI data. When PSI reports are valid then the session becomes active again. |
| ED-Inputs | Element | | Describes the inputs for the edge device. |
| ED-Outputs | Element | | Describes the outputs for the edge device. |

Fig. 3C

ED_Inputs  /76

| ED_Input | Element | | One or more elements describing a specific input |
|---|---|---|---|

ED_Input  /78

| portID | Attribute | Numeric | Describes the port ID of the connection. |
|---|---|---|---|
| mask | Attribute | x.x.x.x | Subnet mask of interface. |
| address | Attribute | IPv4, IPv6, Host Name | The IP address of the port. If not included, ED should use DHCP to get it. |
| BW | Attribute | Number | Mbs |

ED_Outputs  /80

| RF-Output | Element | | One element for each output. |
|---|---|---|---|

RF_Output  /82

| portID | Attribute | Numeric | Number indicating the port of the output. Could be encoded with card, slot, etc. |
|---|---|---|---|
| powerLevel | Attribute | Numeric | Power level in db. |
| frequency | Attribute | Attribute | Numeric | Center frequency of the first QAM channel associated with the RF output. The value is expressed in kHz. |
| portStatus | Attribute | Numeric | Enable or disable the port (1=on/enable, 0=off/disable). |
| QAM-Info | Element | - | One for each QAM contained in RF output. |

Fig. 3D

QAM_Info 90

| ID | Attribute | Number | Indicates vendor internal mapping of QAM within device. |
|---|---|---|---|
| QAMGroupName | Attribute | String | QAM group name. |
| modType | attribute | Number | Indicates the modulation type QAM 64=1, QAM 256=2, QAM 1024=3. |
| uncommittedBW | Attribute | Number | Represents the amount of BW in Kb/sec of bandwidth that should not be reported as part of total. |
| utilLowTrap | Attribute | Number | Represents a percentage of total BW utilization if BW drops below a trap should be generated. Default=0. |
| utilHighTrap | Attribute | Number | Represents a percentage of total BW if exceeded a trap is thrown. Default=100. |
| utilDB | Attribute | Number | Represents the amount (in percent) for which a value should rise above or fall below before second trap is thrown. E.g. once an utilLowTrap is thrown, the BW should rise above the utilLowTrap value+db before a second trap is thrown. This prevents alarm ringing. |
| TSID | attribute | Number | The transport stream ID of this QAM to be carried in the PAT. |
| NITPID | Attribute | Number | The value of the NIT PID. |
| PATInterval | attribute | Number | Time interval, in milliseconds, for PAT insertion. |

| PMTInterval | Attribute | Number | Time interval, in milliseconds, for PMT insertion. |
|---|---|---|---|
| interleaverLevel | Attribute | Numeric | Interleaver level for FEC encoding. (1=level 1, 2=level 2). |
| interleaverMode | Attribute | Numeric | The interleaving depth of the interleaver.<br>fecI128J1(1),<br>fecI128J2(2),    fecI64J2(3),<br>fecI128J3(4),    fecI32J4(5),<br>fecI128J4(6),    fecI16J8(7),<br>fecI128J5(8),    fecI8J16(9),<br>fecI128J6(10),<br>fecI128J7(12),<br>fecI128J8(14). |
| annexMode | Attribute | Numeric | Annex mode of the QAM. 1=annex A, 2=annex B, 3=annex C (ITU-T J.83). |
| channelWidth | Attribute | number | The channel width: 6, 7, or 8 MHz. |
| PortMap | Element | | Optionally define the port map for the QAM. |
| Inband_Info | element | | Inband setting per V3 interface. |

Inband_Info    ↙ 94

| carriageType | attribute | | Inband setting per V3 interface. |
|---|---|---|---|
| markerType | Attribute | | Inband setting per V3 interface. |
| markerSubType | Attribute | | Inband setting per V3 interface. |
| markerValue | Attribute | | Inband setting per V3 interface. |
| markerProgram | Attribute | | Program number that marker should be inserted into. |
| insertInterval | Attribute | | Ms between inserts. |

Fig. 3F

EDGE QAM CONFIGURATION AND MANAGEMENT

CROSS-REFERENCE TO RELATED APPLICATIONS

This application is a continuation of prior U.S. application Ser. No. 11/622,165, filed Jan. 11, 2007, which claims the benefit of U.S. Provisional Application Ser. No. 60/758,487, filed on Jan. 12, 2006, which are hereby incorporated by reference in their entirety.

BACKGROUND OF THE INVENTION

1. Field of the Invention

The invention relates to provisioning, configuring, and monitoring edge QAM devices.

2. Background Art

A modern hybrid fiber coaxial (HFC) cable network in its typical implementation includes fiber cable from a headend to a local network fiber node, and includes coaxial cable for the final signal distribution through a neighborhood. Modern two-way HFC infrastructures are capable of sending gigabytes of data per second to small pockets of homes in a narrowcast way.

Product and service offerings over broadband networks, including cable networks, have expanded in recent years. The cable networks are now used for additional products and services, for example, many cable networks now offer high speed data service in addition to video programming. In the modern HFC cable network, the headend infrastructure may include a cable modem termination system (CMTS) for providing data over cable services in addition to quadrature amplitude modulation (QAM) infrastructure for providing video content. The video QAMs may connect to various content sources, while the CMTS connects subscribers to the provider network. Further, advances in technology allow some functionality to be provided from locations upstream or downstream of the traditional headend.

Video on demand (VOD) is one way to provide video content, and is available in certain broadband networks. To implement a video on demand platform, it is necessary for the architecture to address resource allocation and to address on demand session management.

In one approach to implementing an on demand platform, an architecture for on demand session and resource management is both distributed and scalable. A distributed and scalable architecture for on demand session and resource management is described in International Application No. PCT/US2004/022230, filed on Jul. 9, 2004, published as International Publication No. WO 2005/008419 A2, which entered the National Stage in the United States on Jan. 10, 2006 as U.S. application Ser. No. 10/595,039 and which is hereby incorporated by reference. The architecture may involve various types of on demand services including video on demand (VOD), network PVR, and switched broadcast video.

In an on demand platform, a transport network interfaces with edge QAM devices which interface with client systems. In order to be used, an edge QAM device is required to be configured. More specifically, the edge QAM device must receive configuration information relating to ports, addresses, radio frequency (RF) parameters, etc.

An existing approach to configuring an edge QAM device involves a configuration file that is downloaded to the edge QAM device. The configuration file is in a fixed format, and contains configuration information for a known set of features. Typically, vendors use a proprietary file format for the configuration file. In general, there is no common or standard method of provisioning, configuring, and managing edge QAM devices from different vendors. As a result, configuration and management of edge QAM devices can be difficult.

SUMMARY OF THE INVENTION

It is an object of the invention to provide an improved method of configuring an edge QAM device.

According to the invention, the configuration file utilized to configure the edge QAM device is in a dynamic file format. That is, the configuration file is not in a fixed or static file format. Preferably, the configuration file takes the form of a self-describing document. Extensible Markup Language (XML) is suitable for the configuration file. An advantage of using a non-fixed format file is that configurable device functionality is not limited by the configuration file. Put another way, devices need not be treated as being all the same.

In the preferred embodiment of the invention, the edge QAM device is able to bootstrap itself. The edge QAM device bootstrap process involves an unconfigured device being able to use dynamic host configuration protocol (DHCP) to obtain an Internet protocol (IP) address. The device then initiates a trivial file transfer protocol (TFTP) download of an XML-format device configuration file.

More generally, the unconfigured edge QAM device is able to get itself an address on the network, and initiate a download to itself of the configuration file. DHCP and TFTP are well known and are suitable for this purpose. Any suitable host configuration and file transfer approaches may be used to connect the edge QAM device to the network and download the configuration file.

In other embodiments of the invention, the edge QAM device need not utilize DHCP. For example, the device may be given a static network address, possibly hard coded into the device. In accordance with the invention, the configuration file that is utilized to configure the edge QAM device has a dynamic file format, as opposed to being a fixed or static file format.

The advantages associated with embodiments of the invention are numerous. For example, in the preferred embodiment, an edge QAM device can bootstrap itself to download a configuration file over a network wherein the configuration file is in a dynamic file format, and is preferably in the form of a self-describing document. The result is that various different edge devices can all get themselves up and running when connected, and get themselves configured in an appropriate way for their type. In addition, the dynamic format of the configuration file gives device configuration more independence from the network.

In the preferred embodiment, the invention provides an approach to provisioning, configuring, and managing edge QAM devices, and may involve various types of on demand services including video on demand (VOD), network PVR, and switched broadcast video. The approach may be generally vendor agnostic, providing a common method to perform edge QAM device configuration, and allowing an operator to reuse operations support systems (OSS) tools and processes to manage new edge QAM devices from different vendors.

It is appreciated that embodiments of the invention may involve any suitable underlying initializing and provisioning technique with a dynamic format configuration file. Further, the edge devices may take other forms and the type of cable plant is not limited to coaxial cable or HFC arrangements.

DETAILED DESCRIPTION OF THE PREFERRED EMBODIMENTS

Figure 1:
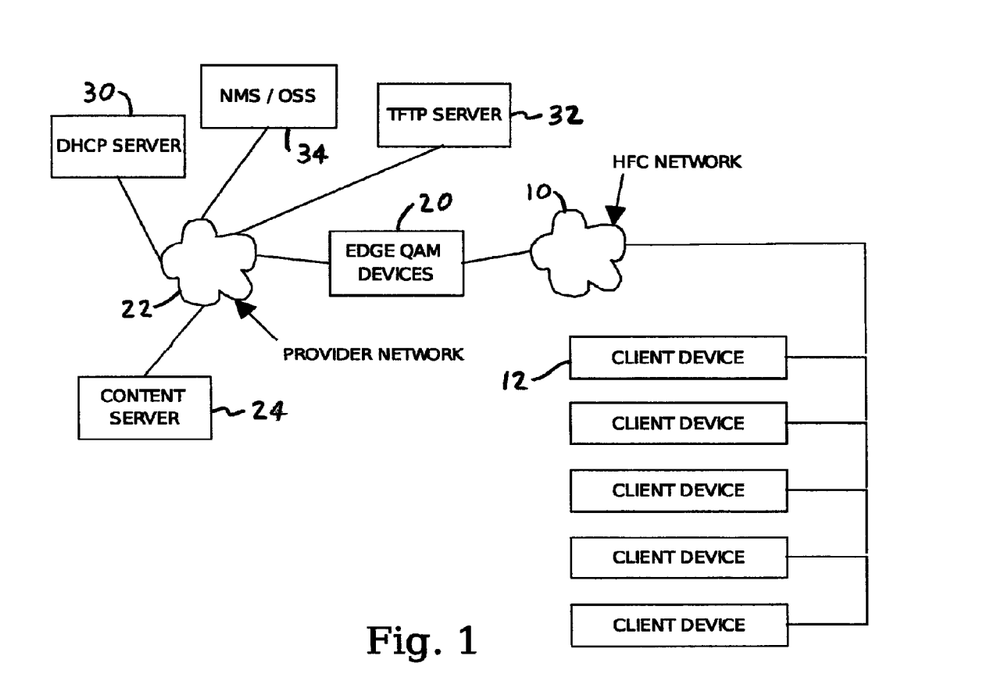
FIG. 1 illustrates a network diagram in accordance with a preferred embodiment of the invention.

In FIG. 1, the hybrid fiber coaxial (HFC) cable network 10 provides services to a plurality of client devices 12. A client device may take a variety of forms such as, for example, a set-top box. The headend equipment includes a plurality of edge quadrature amplitude modulation (QAM) devices 20. The edge QAM devices 20 distribute content to the client devices 12. The edge QAM devices 20 are connected to the provider network 22 and receive content from any number of sources, such as a content server 24.

It is appreciated that the architecture for the headend may vary. In FIG. 1, the edge QAM devices 20 are connected to the provider network 22, and various services are provided to the client devices 12. The provider network 22 includes the appropriate infrastructure for the needed services. As shown, the network includes a dynamic host configuration protocol (DHCP) server 30, and a trivial file transfer protocol (TFTP) server 32 which serves the configuration files for the edge QAM devices 20. The various servers may be located at the headend, or may be located at other locations connected to the provider network 22. Also illustrated are the network management system (NMS) and operations support systems (OSS) 34.

The network management system allows the managing of network elements to, for example, monitor and manage resources. For example, simple network management protocol (SNMP) is a common method used by network management applications to query a management agent with a supported management information base (MIB) object. A MIB object may represent a hardware or software component, and indicates some information about the component.

Figure 2:
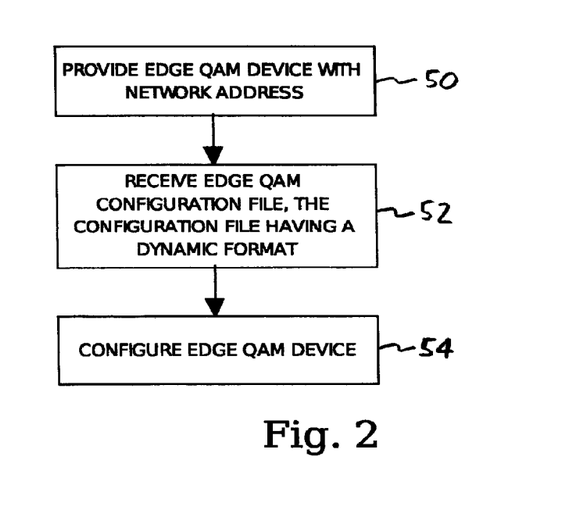
FIG. 2 illustrates a method of provisioning, configuring, and managing an edge QAM device in accordance with a preferred embodiment of the invention.

In order to be used to provide content to the client devices 12, the edge QAM devices 20 must be configured when connected to the provider network 22. FIG. 2 illustrates a method of provisioning, configuring, and managing an edge QAM device in accordance with a preferred embodiment of the invention. In the preferred embodiment of the invention, an unconfigured edge QAM device uses dynamic host configuration protocol (DHCP) to obtain an Internet protocol (IP) address; the device then initiates a trivial file transfer protocol (TFTP) download of an XML-format device configuration file.

With reference to FIG. 2, at block 50, the unconfigured edge QAM device is provided with a network address. DHCP is suitable for this purpose; however, any suitable host configuration approach may be used to connect the edge QAM device to the network. For example, the edge QAM device may be assigned a static network address, or may be configured to connect to the network using any other suitable process as appreciated by one of ordinary skill in the art. In addition, although an Internet protocol (IP) network is described, the network may be of a different type.

In the preferred embodiment, as part of the DHCP process, the edge QAM device provides some identification to the DHCP server. For example, the edge QAM device may include an identification of the device type, as well as some device specific information. This may be achieved using various known DHCP options or extensions.

In the preferred embodiment, the DHCP server provides a network address and subnet mask to be used by the edge QAM device, the network address of the TFTP server, and the name of the configuration file to retrieve from the TFTP server. Further, the DHCP server provides a list of network addresses of one or more routers for forwarding device-originated traffic, a list of network addresses of one or more Domain Name System (DNS) servers, and a domain name to be used by the edge QAM device. Finally, the DHCP server provides an address lease time and a server identifier of the DHCP server. It is to be appreciated that various aspects of the use of DHCP may vary depending on the implementation, and appropriate use of options or extensions is understood by one of ordinary skill in the art.

With continuing reference to FIG. 2, at block 52, the edge QAM device receives the configuration file from the TFTP server. The address of the TFTP server and the configuration file name were obtained during the DHCP process. In the alternative, any suitable file transfer approach may be used to obtain the configuration file, and the above-described approach involving the TFTP server is understood to be the preferred embodiment. Further, any suitable approach may be used to inform the edge QAM device as to the location of the configuration file. In addition, the edge QAM device may provide an additional trigger mechanism to cause the device to receive a new configuration file without requiring rebooting of the device.

In accordance with the invention, the configuration file has a dynamic file format. Embodiments of the invention may involve any suitable initializing and provisioning technique with a dynamic configuration file. The configuration file has a dynamic file format and is preferably in the form of a self-describing document, as opposed to having a fixed or static file format. In the preferred embodiment, Extensible Markup Language (XML) is used for the configuration file. Advantageously, configurable device functionality is not limited by the configuration file. That is, devices need not be treated as being all the same.

At block 54, the edge QAM device is configured according to the received configuration file. The details of an exemplary configuration file format using Extensible Markup Language (XML) are shown in FIGS. 3A-3F. As appreciated by one of ordinary skill in the art, the invention comprehends a dynamic format configuration file and the details of the configuration file may take various forms depending on the implementation. That is, the XML document definition represented by FIGS. 3A-3F is just one example of a configuration file format. The invention is not limited to any particular configuration file format.

Figure 3A:
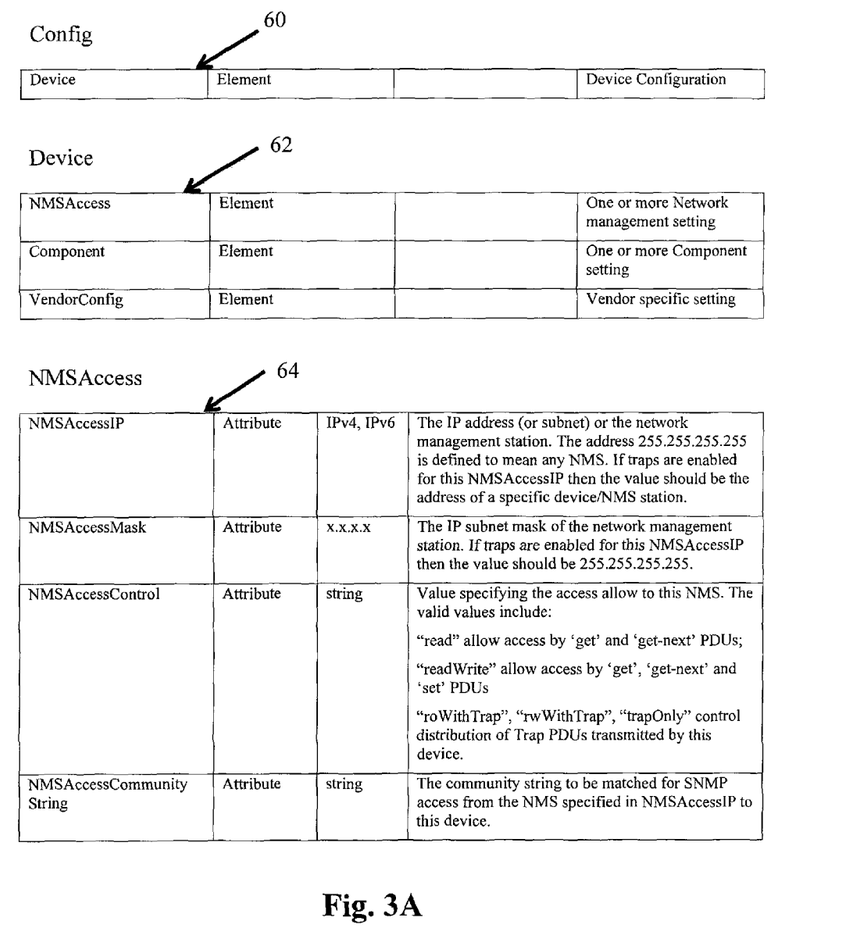
FIGS. 3A-3F illustrate an exemplary configuration file format using Extensible Markup Language (XML).

In FIG. 3A, as defined by the exemplary file format, the configuration file represents the configuration and includes a "Device" element representing the edge QAM device configuration as indicated at 60. As indicated at 62, the "Device" element includes elements "NMS Access" representing one or more network management settings, "Component" representing one or more component settings, and "VendorConfig" representing any vendor specific settings. As indicated at 64, an "NMS Access" element has a plurality of attributes to describe network management settings. Value types for the attributes are illustrated, along with a brief description.

The attribute "NMS AccessIP" indicates the address of the network management station. The attribute "NMS AccessMask" indicates the subnet mask of the network management station. The attribute "NMS AccessControl" specifies details of access control. The attribute "NMS AccessCommunityString" specifies a community string to be matched for SNMP access from the network management station specified in the "NMS AccessIP" attribute.

Figure 3B:
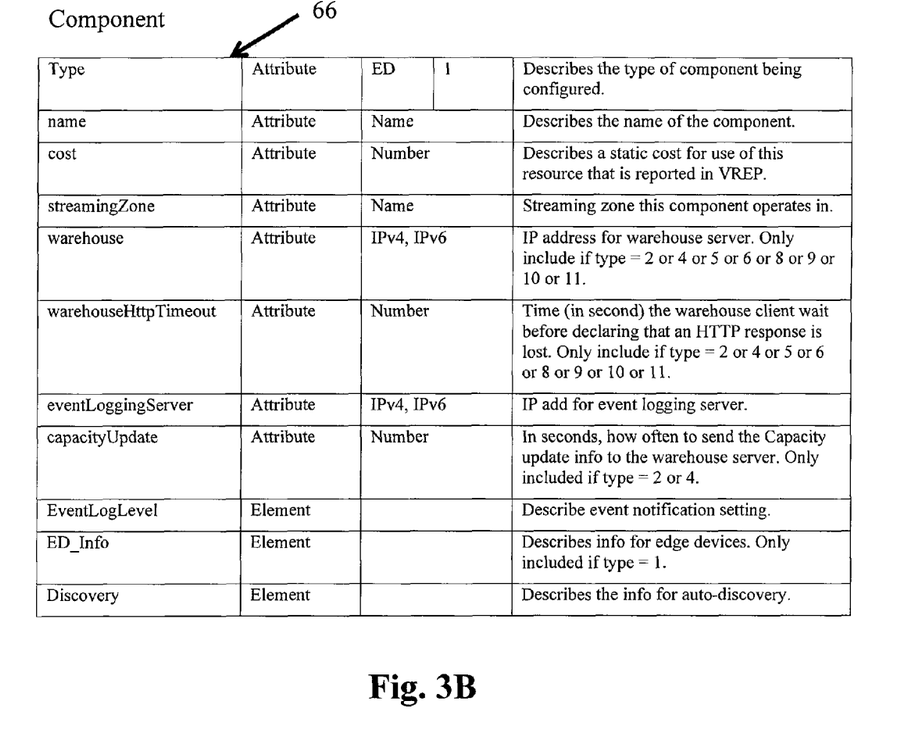

As indicated at 66 in FIG. 3B, a "Component" element has a plurality of attributes to describe component settings. Value types for the attributes are illustrated, along with a brief description. A "Component" element also includes some elements relating to component settings.

The attribute "Type" describes the type of component being configured. The attribute "name" describes the name of the component. The attribute "cost" describes a static cost for use of the resource/component. The attribute "streamingZone" indicates the streaming zone that this component operates in. The attribute "warehouse" indicates the network address for the warehouse server. The attribute "warehouseHttpTimeout" indicates a timeout parameter for a warehouse client. The attribute "eventLoggingServer" indicates the network address for an event logging server. The attribute "capacityUpdate" indicates how often to send a capacity update to the warehouse server.

A "Component" element also includes an "EventLogLevel" element to describe the event notification setting, an "ED_Info" element to describe information for edge devices, and a "Discovery" element that describes information for auto-discovery.

Figure 3C:
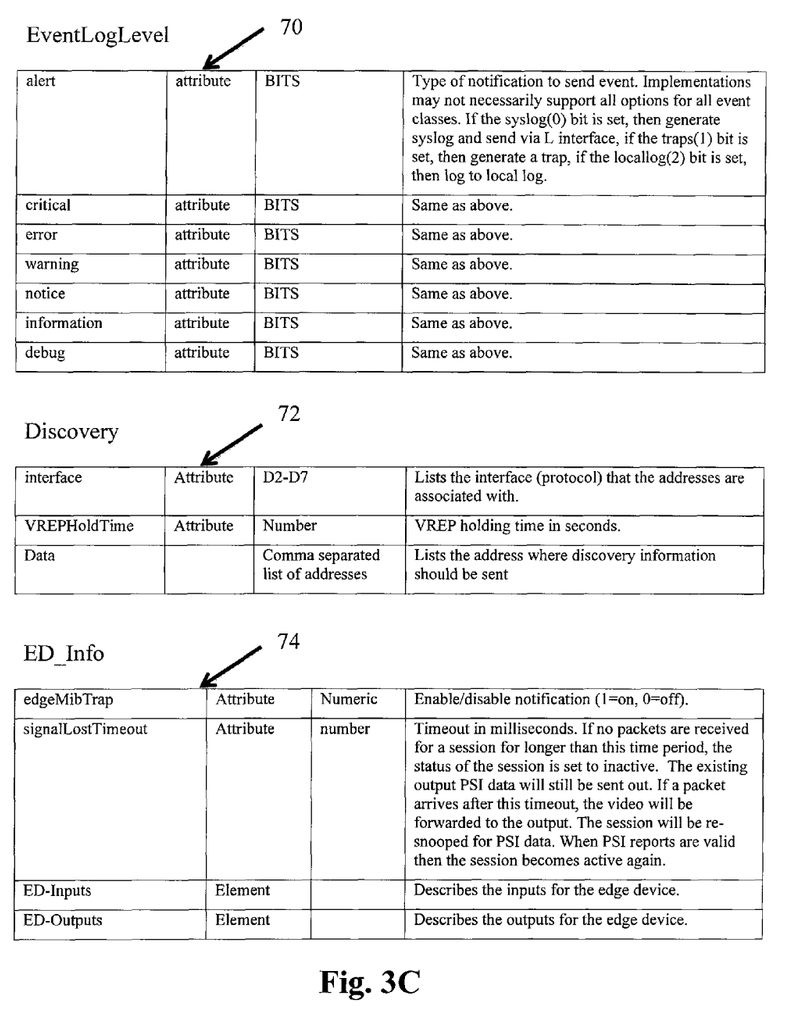

FIG. 3C illustrates further details of these sub-elements within a "Component" element. As indicated at 70 in FIG. 3C, the "EventLogLevel" element has a plurality of attributes to describe the event notification settings. As indicated at 72 in FIG. 3C, the "Discovery" element has a plurality of attributes to describe information for auto-discovery, and includes some discovery-related data.

As indicated at 74 in FIG. 3C, the "ED_Info" element has attributes to describe further information for edge devices, and includes sub-elements "ED_Inputs" for describing the inputs for the edge device and "ED_Outputs" for describing the outputs for the edge device.

Figure 3D:
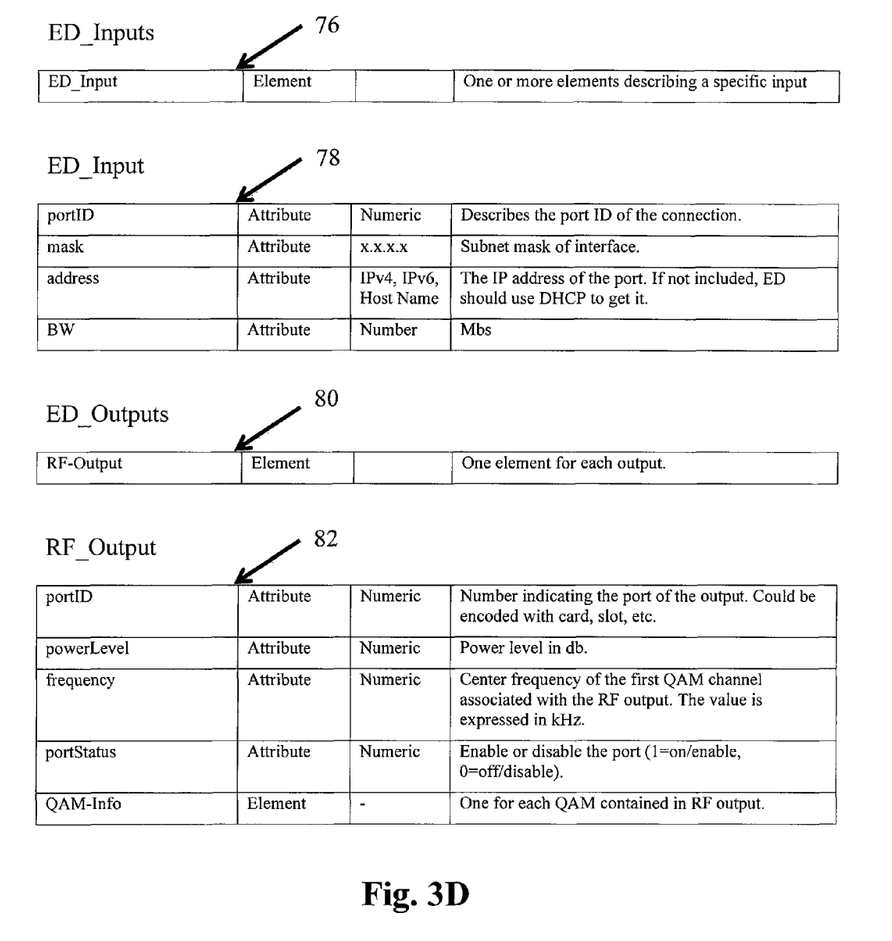

In FIG. 3D, the "ED_Inputs" element is indicated at 76, and contains the sub-element "ED_Input" for describing a specific input. At 78, the "ED_Input" element has several attributes that describe further aspects of the specific input. These attributes specify the network address and subnet mask, port identification, and bandwidth of the edge device input. The "ED_Outputs" element is indicated at 80, and contains the sub-element "RF_Output" for describing a specific radio frequency (RF) output. At 82, the "RF_Output" element has several attributes that further describe aspects of the specific RF output. These attributes specify the port identification, power level, frequency of the first QAM channel, and port status. "RF_Output" element 82 further includes a "QAM_Info" sub-element for each QAM channel contained in the specific RF output.

Figure 3E:
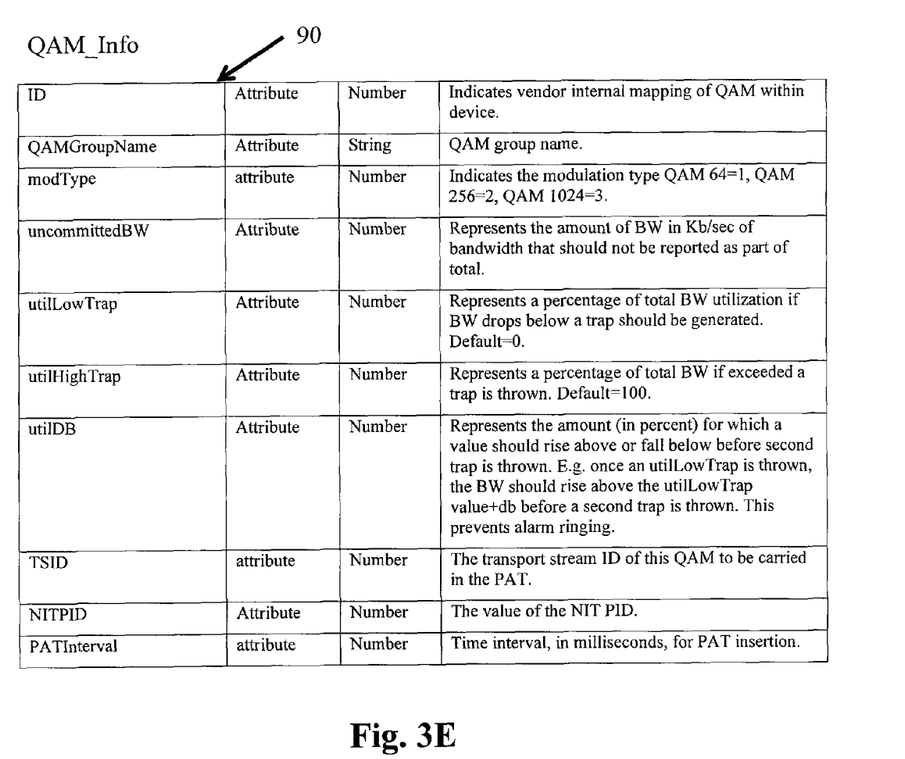
Figure 3F:
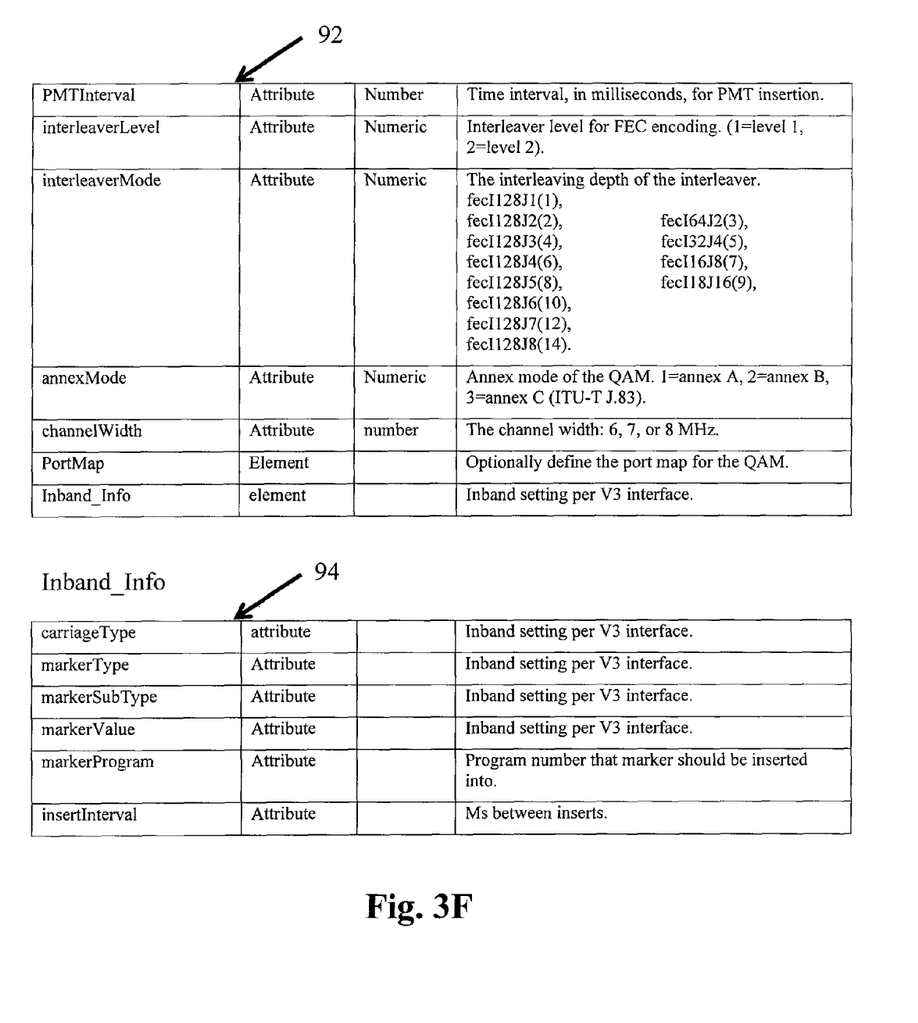

FIGS. 3E-3F illustrate the configuration file format for the detailed information for each QAM channel. As indicated at 90 in FIG. 3E and at 92 in FIG. 3F, a "QAM_Info" element includes several attributes as well as an optional "PortMap" sub-element and an "Inband_Info" sub-element. The "Inband_Info" element includes a plurality of attributes as indicated in FIG. 3F at 94. It is appreciated that the detailed information for a QAM channel may vary depending on the implementation, as understood by one of ordinary skill in the art.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A method comprising:
providing, by a first vendor edge device, an identification of a first vendor edge device type to a network server;
receiving, at the first vendor edge device, data identifying a first configuration file from the network server, the data being based on the first vendor edge device type provided to the network server;
downloading, by the first vendor edge device, the first configuration file based on the data identifying the first configuration file received from the network server; and
configuring the first vendor edge device in accordance with the first configuration file, wherein the first configuration file contains at least one setting specific to a first vendor.

2. The method of claim 1, wherein the first configuration file contains configuration information for the first vendor edge device.

3. The method of claim 2, wherein the configuration information includes information relating to at least one edge device input and information relating to at least one output.

4. The method of claim 2, wherein the configuration information includes information relating to network management to allow monitoring of the edge device.

5. The method of claim 2, wherein the configuration information includes information relating to a network address and port of at least one edge device input.

6. The method of claim 2, wherein the configuration information includes information relating to quadrature amplitude modulation of at least one radio frequency output.

7. The method of claim 1, wherein the first configuration file is in the form of a self-describing document.

8. The method of claim 7, wherein the first configuration file is in accordance with Extensible Markup Language (XML).

9. The method of claim 1 further comprising, prior to the step of providing, connecting the first vendor edge device to a network including providing the first vendor edge device with a dynamic network address.

10. The method of claim 1 further comprising, prior to the step of providing, connecting the first vendor edge device to a network including providing the first vendor edge device with a static network address.

11. The method of claim 1 further comprising, prior to the step of providing, connecting the first vendor edge device to a network including providing the first vendor edge device with a network address based on the first vendor edge device type of the first vendor edge device.

12. The method of claim 9, wherein the dynamic network address is provided by a host configuration server and the data identifying the first configuration file includes a specific location of the first configuration file in the network.

13. The method of claim 1, wherein downloading the first configuration file comprises downloading the first configuration file from a specific location of the first configuration file in a network.

14. The method of claim 1, wherein the first configuration file is in a dynamic file format.

15. The method of claim 1, further comprising:
providing, by a second vendor edge device, an identification of a second vendor edge device type to the network server, wherein the second vendor edge device type is different from the first vendor edge device type;
receiving, at the second vendor edge device, second data identifying a second configuration file from the network server, the second data being based on the second vendor edge device type provided to the network server;

downloading, by the second vendor edge device, the second configuration file based on the second data identifying the second configuration file received from the network server; and configuring the second vendor edge device in accordance with the second configuration file, wherein the second configuration file contains at least one setting specific to a second vendor different from the at least one setting specific to the first vendor.

16. The method of claim 1,
wherein the first configuration file contains configuration information for the first vendor edge device including information relating to at least one edge device input, information relating to network management to allow monitoring of the edge device, information relating to at least one vendor specific setting, and information relating to quadrature amplitude modulation of at least one output.

17. A system comprising:
a storage device connected to a network, the storage device configured to:
  store a first configuration file that contains a first setting specific to a first vendor and a second configuration file that contains a second setting specific to a second vendor different from the first setting specific to the first vendor; and
an edge device connected to the network, the edge device configured to:
  provide an identification of a first vendor edge device type to the network;
  receive data identifying the first configuration file from the network, the data being based on the first vendor edge device type provided to the network;
  download the first configuration file based on the data identifying the first configuration file received from the network; and
  configure itself according to the first configuration file.

18. The system of claim 17, wherein the first configuration file includes a data field identifying the first vendor edge device type and the second configuration file includes a data field identifying the second vendor edge device type.

19. A system comprising:
a first vendor edge device connected to a network, the first vendor edge device configured to:
  provide an identification of a first vendor edge device type to the network;
  receive data identifying a first configuration file from the network, the data being based on the first vendor edge device type provided to the network;
  download the first configuration file based on the data identifying the first configuration file received from the network; and
  configure itself according to the first configuration file, wherein the first configuration file contains at least one setting specific to a first vendor;
a second vendor edge device connected to the network, the second vendor edge device configured to:
  provide an identification of a second vendor edge device type to the network, wherein the second vendor edge device type is different from the first vendor edge device type;
  receive second data identifying a second configuration file from the network, the second data being based on the second vendor edge device type provided to the network;
  download the second configuration file based on the second data identifying the second configuration file received from the network; and
  configure itself according to the second configuration file, wherein the second configuration file contains at least one setting specific to a second vendor different from the at least one setting specific to the first vendor.

* * * * *